(12) United States Patent
Chau et al.

(10) Patent No.: US 12,366,271 B2
(45) Date of Patent: Jul. 22, 2025

(54) METHOD FOR DETERMINING A FORCE TRANSMISSION CONTACT POINT OF AN ELECTRIC CLUTCH ACTUATOR

(71) Applicant: KA Group AG, Zürich (CH)

(72) Inventors: Jimmy Chau, Oslo (NO); Ole Jonny Waerp, Kongsberg (NO); Jimmy Engman, Kongsberg (NO)

(73) Assignee: KA Group AG, Zürich (CH)

( * ) Notice: Subject to any disclaimer, the term of this patent is extended or adjusted under 35 U.S.C. 154(b) by 0 days.

(21) Appl. No.: 18/714,315

(22) PCT Filed: May 4, 2022

(86) PCT No.: PCT/EP2022/061929
§ 371 (c)(1),
(2) Date: May 29, 2024

(87) PCT Pub. No.: WO2023/213387
PCT Pub. Date: Nov. 9, 2023

(65) Prior Publication Data
US 2025/0020176 A1    Jan. 16, 2025

(51) Int. Cl.
*F16D 48/06*    (2006.01)
*F16D 28/00*    (2006.01)
*H02K 41/02*    (2006.01)

(52) U.S. Cl.
CPC ............. *F16D 48/06* (2013.01); *F16D 28/00* (2013.01); *H02K 41/02* (2013.01)

(58) Field of Classification Search
CPC ...... F16D 48/06; F16D 28/00; F16D 2125/40; H02K 41/02
See application file for complete search history.

(56) References Cited

U.S. PATENT DOCUMENTS

2015/0204401 A1*  7/2015  Sakai ............... B60T 13/745
                                                             310/80
2017/0122433 A1    5/2017  Lee
(Continued)

FOREIGN PATENT DOCUMENTS

DE    2445044 A1    4/1975
DE    19957917 A1   6/2000
(Continued)

OTHER PUBLICATIONS

International Search Report for Application No. PCT/EP2022/061929 dated Dec. 16, 2022, 3 pages.
(Continued)

*Primary Examiner* — Farhana Pervin
(74) *Attorney, Agent, or Firm* — Howard & Howard Attorneys PLLC (57) ABSTRACT

The present invention is directed to a method for determining a force transmission contact point of an actuating element (6) of an electric clutch actuator which comprises a linear drive assembly configured to linearly move the actuating element (6) towards a preload plunger (10) which is linked by a pushrod (12) to a clutch lever (14) and to move the pushrod (12) to turn the clutch lever, characterized by including the steps: monitoring an oscillation of the pushrod (12) by monitoring the position of the pushrod (12) and determining in consecutive time periods at least one of a maximum, minimum and centre value of the pushrod position, deriving a measure of non-oscillatory movement of the pushrod (12) based on a difference between at least one of the respective maximum, minimum and centre values of the pushrod position in a current and at least one of the preceding time periods or based on a difference between a combination of the respective positions in the current and at least one of the preceding time periods; and determining that the actuating element (6) has reached the force transmission (Continued)

contact point if the measure of non-oscillatory movement of the pushrod exceeds a predetermined threshold value.

20 Claims, 6 Drawing Sheets

(56) References Cited

U.S. PATENT DOCUMENTS

| | | | |
|---|---|---|---|
| 2017/0363165 A1* | 12/2017 | Engman | ................ F16D 23/00 |
| 2021/0324922 A1 | 10/2021 | Schaller et al. | |
| 2022/0227346 A1* | 7/2022 | Luu | ...................... F16D 65/18 |

FOREIGN PATENT DOCUMENTS

| | | |
|---|---|---|
| DE | 102018126475 A1 | 4/2020 |
| GB | 1451371 A | 9/1976 |
| WO | 2019238224 A1 | 12/2019 |
| WO | 2021064449 A1 | 4/2021 |

OTHER PUBLICATIONS

English language abstract not found for DE 24 45 044 A1; however, see English language equivalent GB 1 451 371 A. Original document extracted from espacenet.com database on May 30, 2024, 32 pages.

English language abstract for DE 199 57 917 A1 extracted from espacenet.com database on May 30, 2024, 1 page.

English language abstract for DE 10 2018 126 475 A1 extracted from espacenet.com database on May 30, 2024, 2 pages.

\* cited by examiner

METHOD FOR DETERMINING A FORCE TRANSMISSION CONTACT POINT OF AN ELECTRIC CLUTCH ACTUATOR

The present invention is directed to a method for determining a force transmission contact point of an actuating element of an electric clutch actuator which comprises a linear drive assembly configured to linearly move the actuating element towards a preload plunger which is linked by a pushrod to a clutch lever and to move the pushrod to turn the clutch lever.

The term electric clutch actuator is used in a broad sense herein and refers actuators of any kind of transmissions involving rotating components which are engaged/disengaged by the actuator.

An electric clutch actuator for vehicle in which a method according to the present invention may be utilized is for example disclosed in WO 2019/238224 A1. The electric clutch actuator comprises a screw within a housing, an electric motor for rotating the screw, a nut as actuating element which is driven, when the screw is rotated by the electric motor, to move linearly in an axial direction (coinciding with the screw axis), and a preload plunger to transfer movement of the nut to a pushrod which is linked to a clutch lever to actuate the clutch. The pushrod is extending in a direction generally parallel to the screw axis, and acts on an end portion of the clutch lever such that when the pushrod is shifted in axial direction the clutch lever is driven to pivot to disengage the clutch. A spring rests with one of its ends on the nut and is, with its opposite end, in abutment against the preload plunger which is guided in the housing for linear movement along the axial direction. The spring keeps a preload on the preload plunger and thereby on the clutch when the screw and nut drive assembly is inactive, i.e. the clutch is engaged. The nut is coupled with the preload plunger such that, when the nut is driven and moved in axial direction a force is transmitted, via an axial force transfer arrangement of one or more intermediate components in contact with each other, to the preload plunger and further to the pushrod so that the pushrod in turn is moved in axial direction to thereby pivot the clutch lever. Due to this arrangement the nut has to be moved over a certain axial distance (in this phase only compressing the spring) before it gets in force transmitting physical contact with the preload plunger thereby starting to transfer force to the preload plunger and thereby to the clutch lever. This position of the nut, where the nut gets in force transmitting contact with the preload plunger, is referred to as force transmission contact point which has to be reported to the transmission control so that nut position is known at which the force transfer by contact from the nut (via preload plunger and pushrod) to the clutch lever starts (or stops when the clutch is returning to the engaged state).

Since the force transmission contact point may vary over the lifetime of the electric clutch actuator and the clutch, this force transmission contact point has to be monitored regularly. One problem associated with the determination of the force transmission contact point is an oscillating movement of the pushrod and the preload plunger, which oscillating movement is in axial direction and which is caused by wobbling movements of rotating components in the clutch and in the further drive train. Wobbling or precession movements of a rotating component occur if there is any kind of imbalance or any kind of force acting perpendicular to the rotational axis of the component that leads to a spinning or precession movement. Such wobbling movements from the clutch are transmitted as oscillating axial movements of preload plunger and pushrod (in the axial direction in which the linear drive assembly moves the actuating component), and such oscillating axial movements are superimposed when the nut is approaching the preload plunger, getting into contact with it, and is starting to move the preload plunger in axial direction, which makes it difficult to precisely determine the force transmission contact point where axial force transfer from the nut to the preload plunger commences and starts axial movement of the preload plunger and the pushrod.

It is an object of the present invention to provide a method which allows to determine the force transmission contact point of an actuating element of an electric clutch actuator in an accurate and reliable manner.

This object is achieved by the method comprising the features of claim 1. Preferred embodiments of the invention are set out in the dependent claims.

According to the present invention in a method for determining a force transmission contact point of an actuating element, the position of the pushrod is monitored in consecutive time periods. A time period is a time interval having a length such that it covers at least one oscillation period of the pushrod. If reference is made to a position in this context this means the position along an axial direction defined by an axis along which the linear drive assembly is configured to linearly move the actuating element. As far as reference is made to the position of the pushrod this position means the position along a linear axis parallel to the axial direction defined by the linear drive assembly (the pushrod typically extends along this linear axis which is not coaxial with the axis of the linear drive assembly but offset by a parallel shift). The pushrod position may also be indirectly be monitored by monitoring the position of the actuating element that is linked to the pushrod.

In the method according to the invention an oscillation of the pushrod is monitored by monitoring the position of the push-rod, and by determining in consecutive time periods each time at least one of a maximum, minimum and centre value of the pushrod position. The length of the time periods is set such that the time period is longer than the oscillation period of the pushrod such that each time period includes at least one maximum and at least minimum position of the pushrod caused by the oscillation.

In the next step a measure of non-oscillatory movement of the pushrod is derived based on a difference between at least one of the respective maximum, minimum and centre values of the pushrod position in a current time period and at least one of the preceding time periods, or based on a difference between a combination of the respective positions in the current and at least one of the preceding time periods. In other words, the time series of minimum, maximum and/or centre positions are analyzed to search for a linear movement component. This derivation of the measure of non-oscillatory movement is not meant to be restricted to subtracting the respective positions of the current and preceding time periods, but requires that this measure is derived "based on" these differences which means that also functions of the differences are included. Such functions of the differences could for example be differences including moving averages of the respective positions in the time series of the respective positions over consecutive time periods or differences including weighted moving averages of the respective positions. If such measure of non-oscillatory movement of the pushrod based on such differences has a significant absolute value, this value is representative of a movement component that is no longer purely oscillatory because in an ideal case of a purely oscillatory movement these differences are zero.

A significant value of the measure of non-oscillatory movement is thus indicative of a linear movement component of the pushrod.

Finally, it is determined that the actuating element has reached the force transmission contact point if the measure of non-oscillatory movement of the pushrod exceeds a predetermined threshold value.

In a preferred embodiment the maximum and the minimum value of the pushrod position are determined in consecutive time periods and are processed in parallel and separately from each other. For each of the maximum and the minimum value a measure of non-oscillatory movement is derived. In the step of determining the force transmission contact point, it is determined that the actuating element reached the force transmitting contact point if at least one of the measures of non-oscillatory movement based on the maximum value and the minimum value, respectively, exceeds the predetermined threshold value. In principle, the two measures of non-oscillatory movement could also be combined into a single measure, for example by averaging the two measures of non-oscillatory movement based on the minimum and the maximum value.

In a preferred embodiment, each time after determination of the maximum and the minimum values in a current time period, the time series of the pushrod positions in the current and the preceding time periods is subjected to a discrete high pass filter, i.e. a filter that favors any significant, rapid changes of the respective maximum and minimum position values between subsequent time periods compared to slow variations. This discrete high pass filter is implemented as follows. First an exponentially weighted moving average of the respective position value over the current and preceding time periods is formed, wherein the time window covered by the moving average can for example be a given number of time periods. Then a difference of averages between the exponentially weighted moving average and a previous exponentially weighted moving average is formed, wherein the previous exponentially weighted moving average can be the one that has been formed in the previous iteration without contribution of the current time period. This can be achieved by assigning the difference of averages to the previous exponentially weighted moving average value. Finally the absolute value of the difference of averages is assigned to the discrete high pass filter output value.

In a preferred embodiment the discrete high pass filter output value of each of the maximum and the minimum value of the pushrod position and assigned to a respective measure of non-oscillatory movement.

In an alternative embodiment the discrete high pass filter output values are processed further in a manner such that each time after determination of maximum and minimum position value in a current time period the discrete high pass filter output value of each of the maximum and the minimum value of the pushrod position is subjected to forming a cumulative sum.

In a preferred embodiment, this cumulative sum is formed by adding the current discrete high pass filter output value to the preceding cumulative sum, by subtracting a predetermined minimum position resolution value, by, if the subtraction result is less than zero, setting the result to zero, by, if the cumulative sum is larger than a predetermined saturation value, setting the cumulative sum to the predetermined saturation value, and by setting the preceding cumulative sum equal to the cumulative sum. Thus, the resulting cumulative sum will continuously increase if the discrete high pass filter output values of any of the maximum and minimum values of the pushrod position are in successive time periods consistently above zero. The limitation of the cumulative sum to a predetermined saturation value prevents that the cumulative sum is influenced too much by a single outlier or runaway which may be caused by an external interference.

In a preferred embodiment the cumulative sum of each of the maximum and the minimum value of the pushrod position is assigned to the respective measure of non-oscillatory movement.

It is preferred that each time after applying the discrete high pass filter to the time series of the maximum and minimum pushrod position the discrete high pass filter output values are scaled up by multiplying it with the sampling rate used in the data acquisition of subsequent measurements of the pushrod position. This is done to numerically enhance potential movement indications.

In a preferred embodiment it is, in the step of determining that the actuating element has reached the force transmission contact point, additionally required, that the measure of non-oscillatory movement exceeds the predetermined threshold value over at least a predetermined time interval. This predetermined time interval could for example include at least two or three consecutive time periods. In this manner it is ensured that the measure of non-oscillatory movement confirms movement to be present in subsequent time period which suppresses a positive determination of movement in case of an external interference causing an isolated indication of movement by a isolated measure of non-oscillatory movement exceeding the threshold value.

In a preferred embodiment the identification of the force transmission contact point of the actuating element is further confirmed by positively identifying a pushrod velocity being above a predetermined threshold velocity value. For this purpose the maximum and the minimum value of the pushrod position in each time period are averaged to determine a centre position of the pushrod. The centre position of the current time period is compared to the centre position of at least one preceding time period to determine a pushrod velocity, and in the step of determining that the actuating element has reached the force transmission contact point it is additionally required that the pushrod velocity exceeds a predetermined threshold velocity value.

In a preferred embodiment each time after determination of a centre value in a current time period the time series of the centre values of the pushrod position in the current and preceding time periods is subjected to an exponentially weighted moving average of the centre values over the current and preceding time periods. Then a discrete derivative of consecutive values of the exponentially weighted moving average centre positions of the pushrod is calculated to determine a pushrod velocity.

Preferably, the time series of pushrod velocity values determined in this manner is subjected to an exponentially weighted moving average of the pushrod velocity values to finally establish the pushrod velocity.

The invention will in the following be described with reference to an embodiment illustrated in the drawings, in which.

Figure 1:
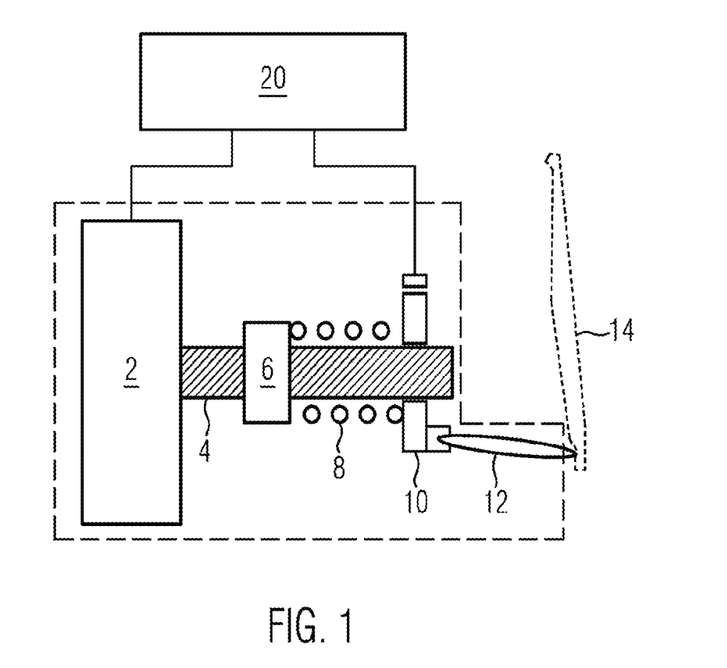
FIG. 1 shows a schematic side view, partially in cross-section, of an electric clutch actuator.

FIG. 1 shows a schematic side view of an electric clutch actuator. The electric clutch actuator includes an electric motor 2 for driving, via a transmission (not shown), a screw (spindle) 4 to rotate around its central axis of rotation. In this case the screw and the nut form a ball screw assembly including a ball screw 4 and a ball nut 6. In such ball screw assembly the helical grooves of the screw are in indirect engagement with the internal helical grooves of the ball nut via balls which roll within the grooves and which are returned by a ball return system (not shown) after they reached an end of engagement end of the ball nut. The ball nut 6 is axially moveable within the housing but held in a manner such that it is prevented from rotation about the central screw axis. An alternative linear drive assembly may utilize a direct driving engagement between the screw and the nut (lead screw and nut drive assembly).

The ball nut 6 forms the actuating element of the electric clutch actuator. When the electric motor 2 rotates the screw 4 the ball nut 6 is driven to move in axial direction along the screw axis. The ball nut 6 is in contact with one end of a compression spring 8 which, with its other end, abuts against a preload plunger 10. The preload plunger 10 is supported to be linearly moveable along the axial direction of the screw 4. The preload plunger 10 is linked to a pushrod 12 which in turn is linked to an end portion of a pivotable clutch lever 14.

When the electric motor 2 is activated to rotate the screw 4, the ball nut 6 is driven to move towards the preload plunger 10. In the first moving phase of the ball nut 6 the compression spring 8 is compressed, whereafter a force transmitting contact is established between the ball nut 6 and the preload plunger 10 (which may be through an intermediate component—not shown in FIG. 1—which is driven for linear movement by the screw 4). If such force transmission contact point is reached the preload plunger 10 is forced to move linearly with the ball nut 6. The method according to the present invention is directed to precisely determine the linear position of the actuating element (ball nut 6) at which the force transmission contact point with the preload plunger 10 is reached and at which the actual clutch actuating phase starts by moving the preload plunger and thereby, via the pushrod 12, pivoting the clutch lever 14.

Since the force transmission contact point may vary over the lifetime of the electric clutch actuator and the clutch, the force transmission contact point has to be monitored and has to be reported to the controller 20 which controls the operation of the electric clutch actuator. The force transmission contact point is determined by detecting the start of linear movement of the preload plunger 10 (or the pushrod 12 which is directly linked to the preload plunger 10), wherein this linear movement is driven by the linear movement of the ball nut 6. As described above, this detection of the movement start of the preload plunger is impeded by an oscillating movement (in axial direction) of the preload plunger 10 (and the pushrod 12) which is caused by rotating components in the clutch and the transmission; at least some of the rotating components will be affected by imbalances, and consequently perform wobbling movements rather than purely rotational movements. Due to the superimposed oscillation of the preload plunger 10 and the pushrod 12 position measurements of one of these components alone do not allow to precisely detect the linear movement start and thus the force transmission contact point.

Figure 2:
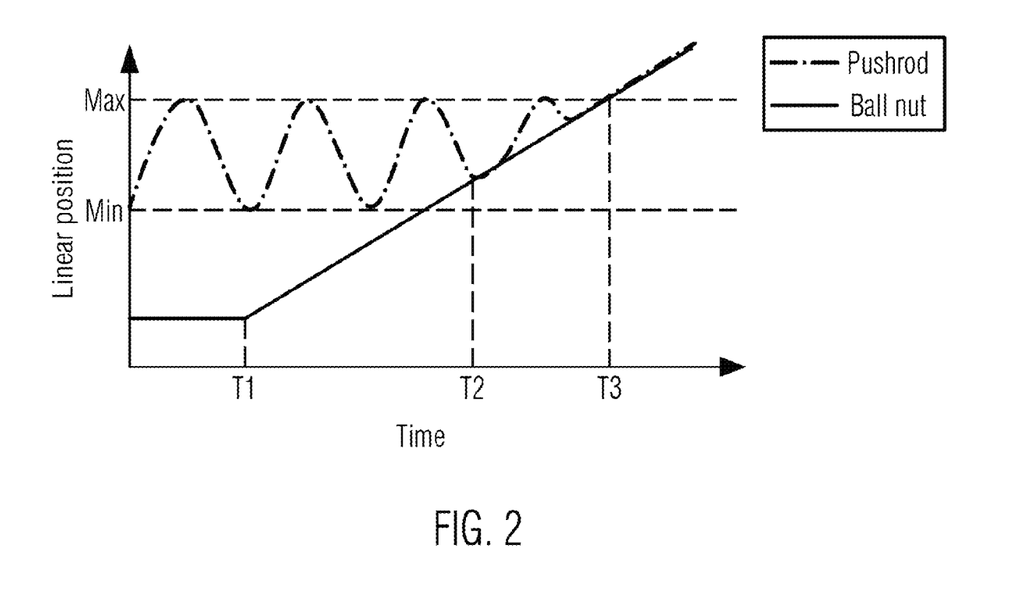
FIG. 2 is a graph showing the linear positions of a pushrod and a ball nut of the electric clutch actuator as a function of time during clutch actuation.

The graph of FIG. 2 illustrates the linear movement of the ball nut 6 and of the pushrod 12 when the electric clutch actuator is actuated to move the clutch lever 14 to disengage the clutch. T1 denotes the point in time at which the controller 20 has activated the electric motor 2 to rotate the screw 4, whereby the ball nut 6 starts linear movement in actuation direction (along the rotational axis of the ball screw 4). This is indicated in FIG. 2 by the solid line showing the position of the ball nut 6 as a function of time: Before T1 the solid line is constant, and at T1 starts a linear increasing portion reflecting the linear movement of the ball nut 6 with constant velocity towards the preload plunger 10.

The dash-dotted line in FIG. 2 shows the pushrod position during the activation cycle of the electric clutch actuator. As shown, the pushrod initially performs an oscillating movement in actuation direction between a minimum value and a maximum value. In the first phase of the ball nut movement between the points in time T1 and T2 the oscillating movement of the pushrod is not affected by the moving ball nut 6 because there is no force transmission contact yet between the ball nut 6 and the preload plunger 10.

At the point in time T2 the ball nut 6 for the first time contacts the preload plunger 10, but this position of the ball nut 6 does not yet establish the force transmission contact point because the pushrod 12, after a short contact phase, continues its oscillation away from the ball nut 6 again (this implies that the velocity of the pushrod 12 in the oscillation phase between minimum and maximum value is higher than the linear movement velocity of the ball nut 6, which is reflected by the larger slope of the dash-dotted oscillation curve between minimum and maximum compared to the slope of the solid line of ball nut movement).

The ball nut 6 comes into contact with the preload plunger 10 shortly before the point in time denoted by T3. At this time the preload plunger 12 starts to move with the ball nut 6, i.e. the force transmission contact point has been reached which corresponds to a continuous force transmission contact between the ball nut 6 and the preload plunger 10 (and pushrod 12). At this second contact the pushrod 12 does not move away from the ball nut 6 again because it is in a phase of the oscillation in which the oscillation would move the pushrod opposite to the direction of movement of the ball nut 6. In principle, the start of the second contact phase of the ball nut 6 with the preload plunger 10 is the point in time which corresponds to the force transmission contact point. The time T3 is indicated in FIG. 2 as the time when the method according to the present invention detected and confirmed the start of linear movement of the pushrod which includes a certain safety margin to verify the linear movement of the pushrod 12.

According to the method of the present invention the position of the actuating element, in this case of the ball nut 6, is monitored which can be done in the controller by recording the cumulated turning angle of the screw 4 which can be used to calculate the linear displacement of the ball nut 6 by multiplying the total turning angle (number of the completed revolutions plus the angle of the non completed revolution) by the pitch of the helical groove of the screw 4.

In addition, an oscillation of the pushrod 12 is monitored by monitoring its position which can also be done by monitoring the position of the preload plunger 10 because the pushrod 12 is linked to the preload plunger 10 so that their linear positions are linked. The position of the preload plunger is monitored by a position sensor measuring the position values of the preload plunger 10, wherein the controller 20 acquires position sensor readings at a given sampling rate. By monitoring the oscillation of the pushrod minimum, maximum and centre position values of the oscillation can be determined in consecutive time periods, as can be seen in FIG. 2. In FIG. 2 a time period could for example cover the time interval from a minimum to the next consecutive minimum of the pushrod position, or be shorter as long as at least one maximum and at least one minimum pushrod position is included.

In the time range before T2 the minimum values (as well as maximum values and centre values) in consecutive time periods are essentially constant because there is a purely oscillating movement. For this reason a measure of non-oscillatory movement of the pushrod is derived based on a difference between at least one of the respective maximum, minimum and centre values of the pushrod position in a current and at least one of the preceding time periods. Such measure of non-oscillatory movement will be zero or very small as long as there is a pure oscillatory movement, as one can see from FIG. 2 for times before T2. As can also be seen from FIG. 2 the measure of non-oscillatory movement of the pushrod based on differences of at least one of the position values mentioned in subsequent time period quickly shows values that are significantly larger than zero once the force transmission contact point has been reached. For example, after the last maximum position of the oscillation in the time between T2 and T3 the following minimum value detected will already significantly differ from the minimum values in preceding time periods, and this feature of the measure of non-oscillatory movement of the pushrod is used when comparing it to a predetermined threshold value to establish that the force transmission contact point between the ball nut 6 and the pushrod 12 has been reached. The position of the actuating element (ball nut 6) at this point in time is then assigned to the force transmission contact point of the actuating element and stored in the control unit.

In the following an embodiment will be described how the position readings of the pushrod are analyzed to determine the measure of non-oscillatory movement of the pushrod, and to eventually determine the force transmission contact point of the actuating element.

Figure 3:
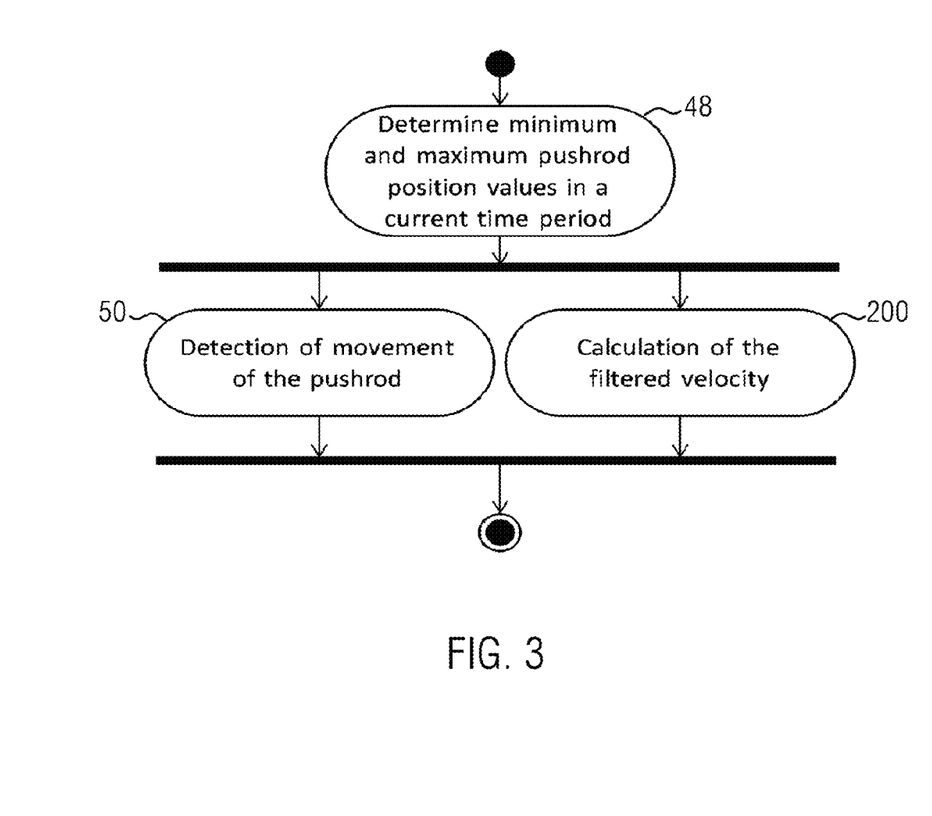
FIG. 3 shows a flow diagram of the main process routines of an exemplary embodiment of a method according to the present invention.

FIG. 3 shows a flow diagram of the main process routines to determine the force transmission contact point of the actuating element. In the method of this embodiment in addition to deriving a measure of non-oscillatory movement of the pushrod to detect its movement start in process steps 50, in parallel the linear movement velocity of the pushrod is determined in process steps 200 which is used as an additional confirmation that the force transmission contact point has been reached if the determined velocity is above a predetermined velocity threshold. In the process steps 48 readings from the position sensor of the pushrod are acquired at a sampling rate, and are analyzed (for example in the controller 20) over a current time period to determine maximum, minimum and centre value in the current time period. There are various ways how maximum, minimum and centre value in a time period can be determined. For example, the position sensor readings could be recorded by storing consecutive sensor readings in a ring buffer, and once the ring buffer is filled at the end of the current time period the maximum and minimum values be determined from the recorded position readings, and the centre value be calculated as the average of minimum and maximum values. Simultaneously, the consecutive time period is started by beginning to fill the ring buffer again. Alternatively, when the first position sensor reading of the time period is input to process 48, this position input value could be assigned to a variable MAX and a variable MIN; each time a new position sensor input is incoming it is checked:

input>MAX? if yes, MAX=input, and if no,
input<MIN? if yes, MIN=input.

If none of the two questions is answered by yes, MAX and MIN remain unchanged. At the end of the time period, for example after checking 100 position input values, MAX and MIN contain the maximum and minimum pushrod position values for the current time period.

In case a ring buffer is utilized the length of the ring buffer, i.e. the number of storage elements in the ring buffer, determines, together with the sampling rate at which position readings are acquired from the position sensor and fed into the ring buffer, the length of time period which is used by the method of the present invention to determine minimum, maximum and centre values of the pushrod position in this time period. As indicated before, this time period should be larger than the oscillation period to ensure that each of the recorded and analyzed time periods includes at least one minimum and one maximum value of the oscillation. In principle, the process could also determine the oscillation period from time differences between subsequent minimum and maximum values, and adjust the length of the time period if necessary, by increasing the length of the time period during which position readings are analyzed to determine minimum and maximum position in the current time period. Consecutive time periods can follow each other directly, i.e. at the end of one time period the next current time period starts immediately. Alternatively, there can also be a short break between consecutive time periods.

Figure 4:
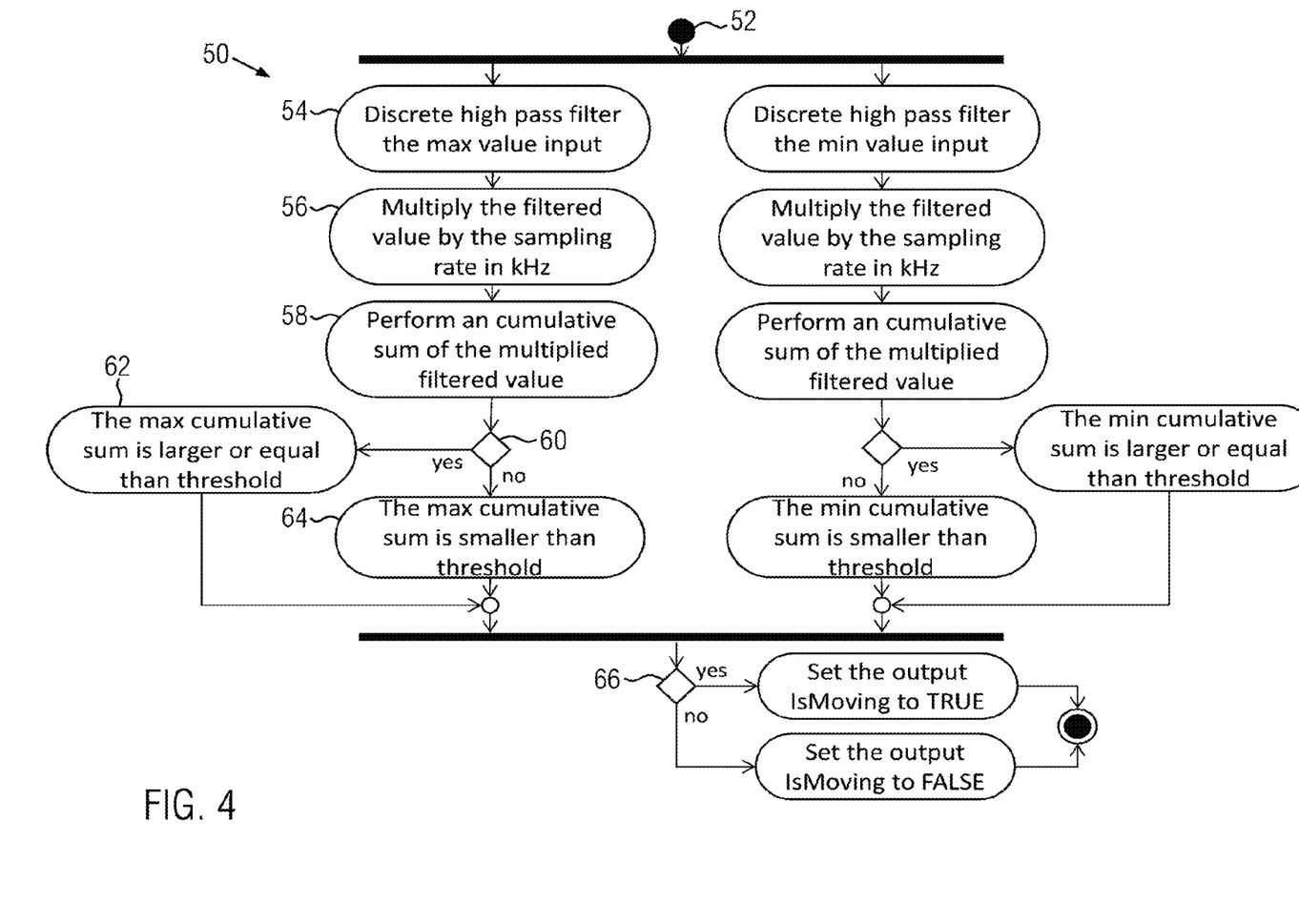
FIGS. 4 to 7 show flow diagrams illustrating subroutines for processing of measurement data in a method according to the present invention as illustrated in FIG. 3.

The time series of the determined minimum and maximum values of the pushrod position in consecutive time periods are then processed further in the routine block 50 of FIG. 3 which is shown in more detail in FIG. 4. In this embodiment minimum and maximum values of the pushrod positions are analyzed in parallel and separate from each other. The time series of minimum values and of maximum values are received at input 52, wherein the maximum position values are processed in the branch on the left hand side, and the minimum position values are processed in parallel in the branch on the right hand side. Both branches of steps for the minimum and maximum values work with the same algorithm so that in the following only the left hand side branch for the maximum position values will be described. In process step 54 the time series of the maximum position values is subjected to a discrete high pass filter which favors rapid and significant changes and suppresses slowly varying changes between subsequent values. The discrete high pass filter is shown in more detail in the flow diagram of FIG. 5.

Figure 5:
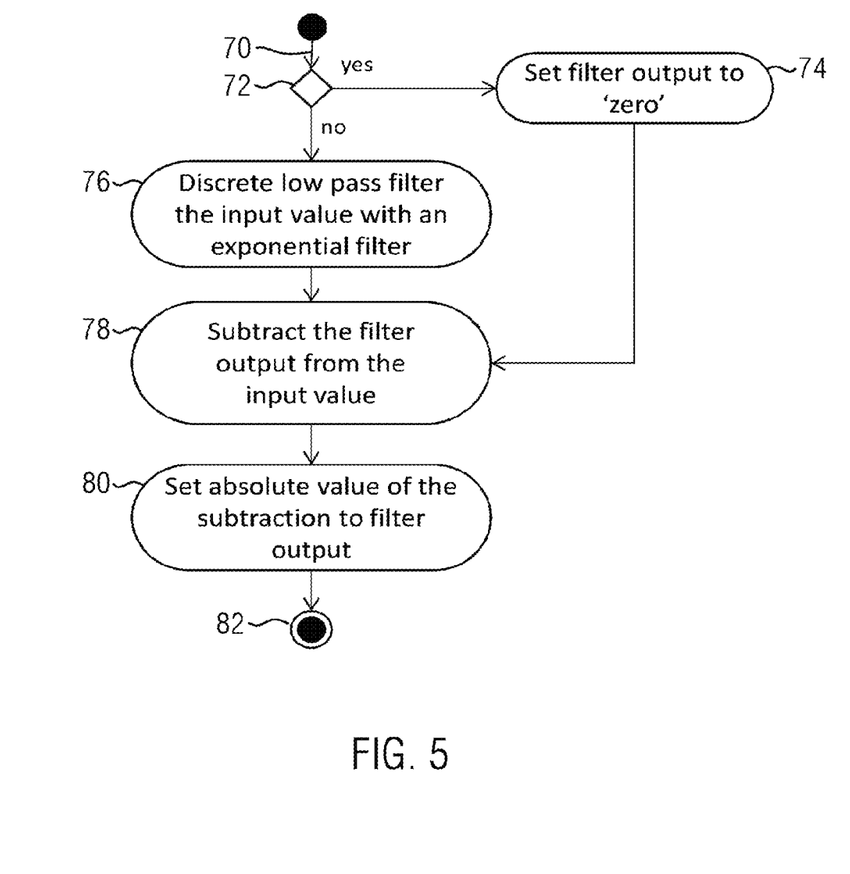

With reference to FIG. 5, it is determined in decision step 72 whether it is the first time that the high pass filter runs. If yes, the process continues with step 74 in which the filter output (which is the output value that the discrete high pass filter outputted in the preceding run) is set to zero, and with continues step 78 in which the filter output is substracted from the input value from input 70, whereafter the absolute value of the difference is taken in step 80, and the absolute value is sent as discrete high pass filter output to output 82. If in decision step 72 it is determined that it is not the first run of the discrete high pass filter the process continues with step 76 in which the current input value and the preceding input value(s) of the maximum position value of the pushrod are subjected to a weighted moving average, wherein an exponentially weighted moving average is applied (designated as "exponential filter" in FIG. 5) which exponentially suppresses past maximum values the more, the longer the past period is ago. Then the process continues with step 78 in which the filter output is subtracted from the input value, and the absolute value of the difference is sent as filter output to output 82. In this manner the discrete high pass filter of FIG. 5 will deliver very low output values in case the time series of the maximum positions of the pushrod is constant or slowly varying, whereas a significant change of the maximum value in the current time period compared to past time periods will result in a large discrete high pass filter output.

With reference to FIG. 4 again, the description of the process will now be continued with the process step following the above-described discrete high pass filter in step 54. In step 56 the output value of discrete high pass filter is enlarged by multiplying it with the sampling rate of position reading in kHz. This is done to enlarge the numerical value of the filtered result.

The output of step 56 is then subjected to forming a cumulative sum in process steps 58 of the scaled up discrete high pass filter output. The cumulative sum will be described further below with reference to FIG. 6.

In decision step 60 of FIG. 4 it is checked whether the cumulative sum is larger or equal to the predetermined threshold. If yes, the process continues via step 62 to decision step 66 where it is checked whether cumulative sum of the maximum position values or the cumulative sum of the minimum position values is larger or equal to the predetermined threshold. If yes, the output of the variable IsMoving is set to TRUE, if the result of the decision step 66 is no, the variable IsMoving is set to FALSE.

With the result that the cumulative sum of the discrete high pass filtered maximum values or minimum values is larger than the predetermined threshold the method according to the present invention could in principle be terminated by determining that the actuating element (ball nut) has reached the position corresponding to the force transmission contact point if the measure of non-oscillatory movement of the pushrod has been found to be larger than the predetermined threshold, and if not by determining that the actuating element has not yet reached the force transmission contact point.

Figure 6:
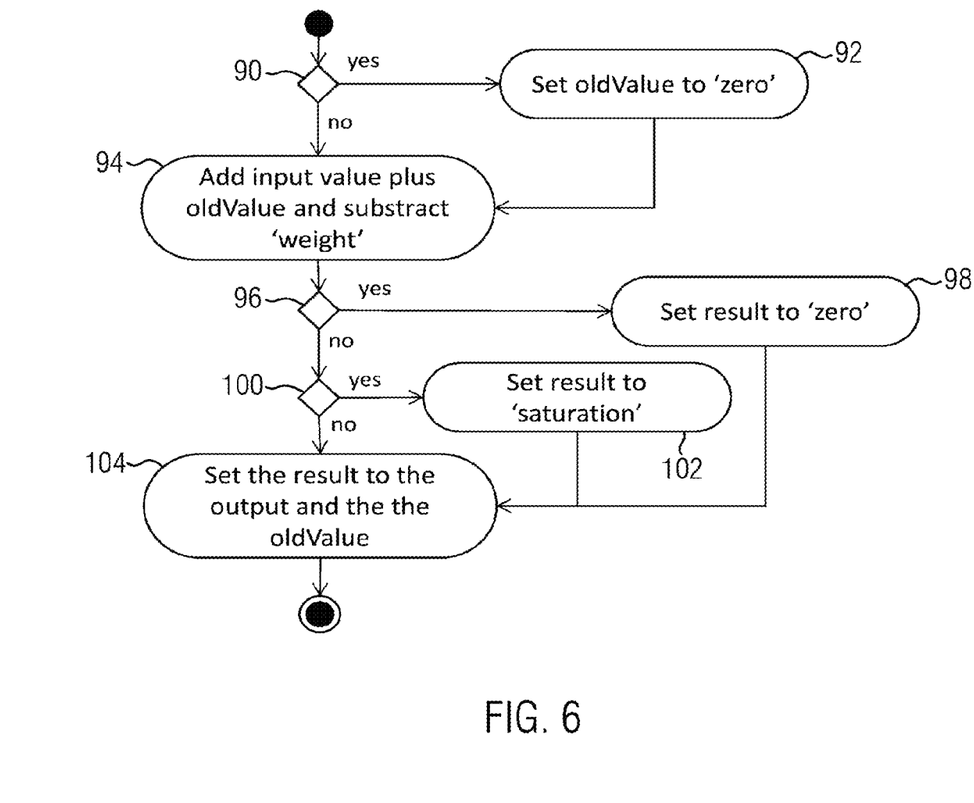

Now the determination of the cumulative sum of step 58 in FIG. 4 will be described in more detail with reference to FIG. 6. In the first decision step 90 of forming the cumulative sum it is checked whether it is the first run of the cumulative sum. If yes, a variable oldValue is set to zero in step 92. If the result of the decision 90 is no, or after the step 92 has been performed, the process continues in step 94 in which the input value of the cumulative sum is added to the variable oldValue and a parameter "weight" is subtracted from this sum. The parameter weight is a measure of the position resolution which is achieved in the determination of the pushrod position. In decision step 96 it is checked whether the result of step 94 is lower than or equal to zero. If yes, the result is set to zero in step 98, whereafter step 104 is performed in which the result is set to the output value and to the variable oldValue.

If the answer to the decision step 96 is no, the process continues with decision step 100 in which it is checked whether the result is larger or equal to a predetermined parameter "saturation". If yes, the result is set to this parameter "saturation" before the process continues with step 104. If the answer is no, the result of step 94 is in step 104 set to the output value and to the variable oldValue.

The cumulative sum, which is the cumulative sum of the discrete high pass filter output for the maximum positions, is regarded in this embodiment as the measure of non-oscillatory movement of the pushrod based on differences between the maximum values of the pushrod position in a current and at least one of the preceding time periods. The output of the cumulative sum as formed according to the flow diagram of FIG. 6 is then further processed continuing with decision step 60 of the process of FIG. 4.

In the embodiment described here not only a measure of nonoscillatory movement of the pushrod is checked to conclude that the pushrod started moving when the measure of non-oscillatory movement is larger than a predetermined threshold, but the position sensor data of the pushrod are further analyzed to determine a pushrod velocity and to check whether the pushrod velocity is larger than a predetermined velocity threshold to confirm the finding that the force transmission contact point has been reached.

Figure 7:
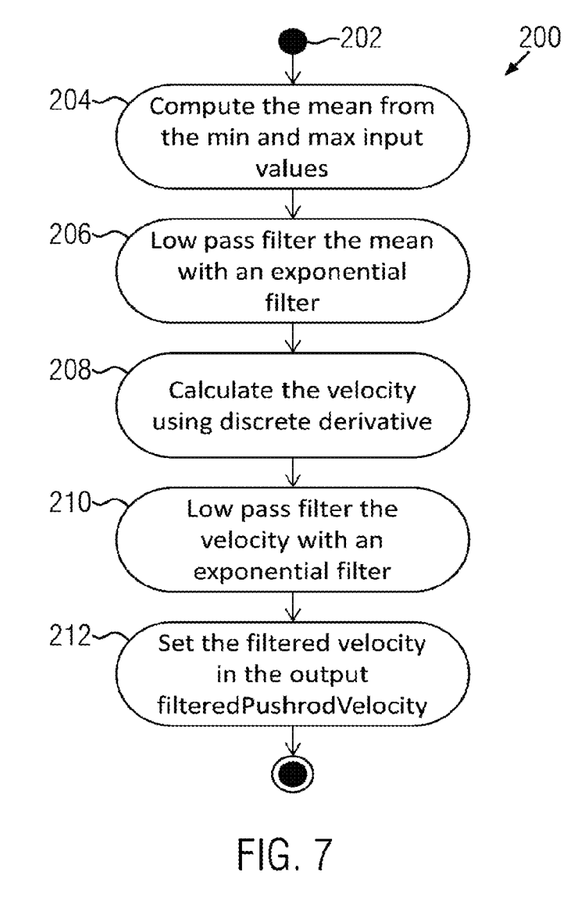

FIG. 7 shows the flow diagram of the process 200 for calculating the pushrod velocity. At input 202 the minimum and the maximum position value of the current time period are received. In step 204 the mean or centre value is calculated as the average of the minimum and the maximum position values. The time series of the centre values of the pushrod position of the current time period and preceding time periods is processed by a low pass filter in step 206 which is implemented as an exponentially weighted moving average of the centre value of the current time period and preceding time periods. Such exponentially weighted moving average, also known as exponential smoothing, strongly favors the current time period and most recent time periods with higher weights and is thus close to the actual centre value. From the time series of the filtered centre values from step 206 the velocity is calculated in step 208 by forming a discrete derivative. In the next step 210 the time series of the calculated velocities in the current and preceding time period is low pass filtered using again an exponentially weighted moving average, and this filtered velocity value is output in step 212 as the filtered pushrod velocity. As shown in FIG. 3 the filtered pushrod velocity is then available as a second quantity which can be checked to fulfill a threshold condition, namely that the filtered pushrod velocity exceeds a predetermined threshold velocity value. This condition can be checked as a further confirmation which has to be fulfilled in order to conclude that the pushrod started linear movement, i.e. that the force transmission contact point has been reached.

The invention claimed is:

1. A method for determining a force transmission contact point of an actuating element of an electric clutch actuator which comprises a linear drive assembly configured to linearly move the actuating element towards a preload plunger which is linked by a pushrod to a clutch lever and to move the pushrod to turn the clutch lever, including the steps:
   monitoring an oscillation of the pushrod by monitoring a position of the pushrod and determining in consecutive time periods at least one of a maximum, minimum and centre value of the pushrod position,
   deriving a measure of non-oscillatory movement of the pushrod based on a difference between at least one of the respective maximum, minimum and centre values of the pushrod position in a current and at least one of the preceding time periods or based on a difference between a combination of the respective positions in the current and at least one of the preceding time periods; and
   determining that the actuating element has reached the force transmission contact point if the measure of non-oscillatory movement of the pushrod exceeds a predetermined threshold value.

2. The method according to claim 1, wherein the maximum and the minimum value of the pushrod position are determined in consecutive time periods forming a time series, that for each of the maximum and minimum values the measure of non-oscillatory movement is derived, and that, in the step of determining the force transmission contact point, it is determined that the actuating element has reached the force transmission contact point if at least one of the measures of non-oscillatory movement based on the maximum and minimum values, respectively, exceeds the predetermined threshold value.

3. The method according to claim 2, wherein each time after determination of the maximum and the minimum value in a current time interval, the time series of the pushrod positions in the current and the preceding time periods is subjected to a discrete high pass filter for each of the maximum and the minimum value by
forming an exponentially weighted moving average over the current and preceding time periods,
forming a difference of averages between the exponentially weighted moving average and a previous exponentially weighted moving average value,
assigning the difference of averages to the previous exponentially weighted moving average value, and
assigning the absolute value of the difference of averages to a discrete high pass filter output value.

4. The method according to claim 3, wherein the discrete high pass filter output value of each of the maximum and the minimum value of the pushrod position is assigned to the respective measure of non-oscillatory movement.

5. The method according to claim 3, wherein each time after determination of a maximum and a minimum pushrod position value in a current time period, the discrete high pass filter output value of each of the maximum and the minimum value of the pushrod position is subjected to forming a cumulative sum.

6. The method according to claim 5, wherein the cumulative sum is formed by adding the current discrete high pass filter output to the preceding cumulative sum, by subtracting a predetermined minimum position resolution value, if the subtraction result is less than zero by setting it to zero, if the cumulative sum is larger than a predetermined saturation value by setting the cumulative sum to the predetermined saturation value, and by setting the preceding cumulative sum equal to the cumulative sum.

7. The method according to claim 5, wherein the cumulative sum of each of the maximum and the minimum value of the pushrod position is assigned to the respective measure of non-oscillatory movement.

8. The method according to claim 3, wherein each time after applying the discrete high pass filter its output values are scaled up by multiplying them with a sampling rate used in the measurement acquisition of pushrod positions.

9. The method according to claim 1, wherein in the step of determining that the actuating element has reached the force transmission contact point it is additionally required that the measure of non-oscillatory movement exceeds the predetermined threshold value over at least a predetermined time interval.

10. The method according to claim 1, wherein in each time period the maximum and the minimum value of the pushrod position is averaged to determine a centre position of the pushrod, and the centre position of a current time period is compared to the centre position of at least one preceding time period to determine a pushrod velocity, and in that in the step of determining that the actuating element has reached the force transmission contact point it is required that the pushrod velocity exceeds a predetermined threshold velocity value.

11. The method according to claim 10, wherein:
each time after determination of a centre value of the pushrod position in a current time period, the time series of the centre positions in the current and preceding time periods is subjected to an exponentially weighted moving average, and
a discrete derivative of the consecutive exponentially weighted moving average values of the centre position is calculated to determine the pushrod velocity.

12. The method according to claim 11, wherein the time series of calculated pushrod velocities in consecutive time periods is subjected to forming an exponentially weighted moving average to determine the pushrod velocity.

13. The method according to claim 6, wherein the cumulative sum of each of the maximum and the minimum value of the pushrod position is assigned to the respective measure of non-oscillatory movement.

14. The method according to claim 2, wherein in the step of determining that the actuating element has reached the force transmission contact point it is additionally required that the measure of non-oscillatory movement exceeds the predetermined threshold value over at least a predetermined time interval.

15. The method according to claim 3, wherein in the step of determining that the actuating element has reached the force transmission contact point it is additionally required that the measure of non-oscillatory movement exceeds the predetermined threshold value over at least a predetermined time interval.

16. The method according to claim 4, wherein in the step of determining that the actuating element has reached the force transmission contact point it is additionally required that the measure of non-oscillatory movement exceeds the predetermined threshold value over at least a predetermined time interval.

17. The method according to claim 5, wherein in the step of determining that the actuating element has reached the force transmission contact point it is additionally required that the measure of non-oscillatory movement exceeds the predetermined threshold value over at least a predetermined time interval.

18. The method according to claim 2, wherein in each time period the maximum and the minimum value of the pushrod position is averaged to determine a centre position of the pushrod, and the centre position of a current time period is compared to the centre position of at least one preceding time period to determine a pushrod velocity, and in that in the step of determining that the actuating element has reached the force transmission contact point it is required that the pushrod velocity exceeds a predetermined threshold velocity value.

19. The method according to claim 3, wherein in each time period the maximum and the minimum value of the pushrod position is averaged to determine a centre position of the pushrod, and the centre position of a current time period is compared to the centre position of at least one preceding time period to determine a pushrod velocity, and in that in the step of determining that the actuating element has reached the force transmission contact point it is required that the pushrod velocity exceeds a predetermined threshold velocity value.

20. The method according to claim 4, wherein in each time period the maximum and the minimum value of the pushrod position is averaged to determine a centre position of the pushrod, and the centre position of a current time period is compared to the centre position of at least one preceding time period to determine a pushrod velocity, and in that in the step of determining that the actuating element has reached the force transmission contact point it is required that the pushrod velocity exceeds a predetermined threshold velocity value.

\* \* \* \* \*